United States Patent Office 3,846,293
Patented Nov. 5, 1974

3,846,293
LIQUID WASTE TREATMENT
Sylvester J. Campbell, 9317 Alton St.,
Philadelphia, Pa. 19115
Filed Feb. 22, 1972, Ser. No. 228,103
Int. Cl. C02b 1/20; C02c 1/40
U.S. Cl. 210—18
20 Claims

ABSTRACT OF THE DISCLOSURE

Impurities from a liquid waste are removed in a multi-phase process which includes chemical-physical treatment of the liquid waste. In one phase, the liquid waste is treated with a first charge-density reducing agent, for example, ferric chloride, to coagulate and flocculate some of the impurities. In a succeeding phase the liquid waste, having suspended therein the floc formed in the first phase, is treated with a second charge-density reducing agent, for example, lime, to effect additional coagulation and flocculation of the impurities and thereby place them in a form which is separated readily from the treated liquid. Also, the liquid waste can be oxidized chemically and/or biologically to remove impurities which may be present, but which are not removed by the chemical-physical treatment.

BACKGROUND

This invention relates to the removal of impurities from a liquid medium, and more particularly, to an improved chemical-physical method for purifying liquids such as polluted water.

The purification of water polluted with sewage, industrial wastes and other pollutants is a problem of ever increasing magnitude. Presently, the most widely used liquid waste purification systems for mass purification have relied on biological aeration for the removal of suspended contaminants or other impurities from the waste which are in a soluble form.

Typically, the biological process requires several primary settling tanks of sufficient size to accommodate a predetermined surface settling rate for a predetermined and relatively long detention time to allow sedimentation of the settleable suspended particles. After the primary settling stage, the liquid waste is passed to a trickling filter or aeration module.

In the case of a trickling filter, liquid waste is passed over biological slime. The waste which is diverted to the aeration module is acted upon by biomasses formed in an aerobic environment. The colloidal particulate matter is removed by collision of the biomasses and the colloids. Soluble portions of the liquid waste are removed by adsorption by the biomasses which ingest it as a nutrient.

After biological action as described above, the waste again passes to one or more secondary settling tanks for further clarification by simple sedimentation, and then the treated liquid is discharged from the treatment system.

Biological waste treatment process installations are extremely expensive because they require the use of large amounts of land to accommodate the various modules required. In order to treat the liquid waste effectively, it must remain in the treatment installation for a substantial length of time. Moreover, biological processes are affected adversely by the presence in the liquid waste of toxic chemicals, such as pesticides, heavy metals and thiosulphates. Such toxic chemicals, which are frequently present in industrial and domestic waste, when present to a substantial degree, significantly inhibit the effectiveness of a biological treatment system.

The recent recognition of the harmful effects that untreated liquid wastes have on the environment has resulted in the promulgation of stricter water pollution regulations by both local and Federal governments. The stricter requirements of these regulations have necessitated the provision of waste treatment processes which are capable of purifying all types of polluted liquids, including the purification of industrial wastes.

Chemical-physical waste treatment processes, unlike biological processes, are not affected adversely by the presence of toxic chemicals in the liquid waste to be treated and hence may be applied to a wider variety of polluted wastes then biological treatment processes. However, experience with heretofore known chemical-physical waste treatment systems has shown that they do not remove consistently all of the impurities which should be removed. It is believed that this problem is encountered because the behavior of micro-macro colloids and the interaction thereof with coagulants for removing them from the waste is not understood fully.

It is known that colloidal particles suspended in a liquid medium such as sewage, industrial waste and the like generally have a layer of electrical charges closely surrounding the surface of the particles with charges of the opposite polarity dispersed generally throughout the liquid medium. In waste water, the surface charge of suspended particles is generally negative. The presence of the surface charges on the suspended particles inherently causes the particles to repel each other and hence prevents the particles from agglomerating or flocculating together to form larger particles or floc of high density which may be precipitated from the liquid medium.

The relative magnitude of the surface charges of suspended particles is hereinafter referred to as the "charge-density" of the particles. The relative magnitude of the charge-density of particles suspended in a liquid medium may be stated in terms of several different types of units such as, for example, Zeta Potential, AC streaming current, and DC streaming potential. For purposes of this application, the relative magnitude of the charge-density will be stated in terms of its Zeta Potential in millivolts, as determined by a "Zeta-Meter," a commercially available instrument sold by Zeta-Meter, Inc. of New York, New York, as a measure of the electrophoretic mobility of the suspended colloids.

It is known that when the charge-density of particles suspended in a liquid medium is reduced or neutralized and brought toward zero charge density, the suspended particles are more easily and readily flocculated into denser particles for removal from the liquid medium. It should be noted that the presence in the waste of hydrophilic colloidal particulates creates difficulty in the neutralization thereof because of a protective water bound layer which surrounds the colloid.

It is an object of this invention to provide an improved chemical-physical liquid waste treatment process for purifying liquid waste rapidly, inexpensively, and efficiently. This object is fulfilled and other important developments are afforded by the invention described hereinafter.

SUMMARY OF THE INVENTION

In accordance with this invention, liquid waste is subjected to a multi-phase chemical-physical treatment process. In the first or densifying phase, the waste is treated with a first charge-density reducing agent, preferably an inorganic salt having a trivalent cation and most preferably ferric chloride, to reduce the zeta potential of the particles to a value at which some of the more easily removed, suspended particles coagulate and partially flocculate. These coagulated and partially flocculated particles are maintained in suspension in the liquid and are transferred together with the liquid to a succeeding treatment phase, wherein a sufficient quantity of a second charge-density reducing agent, preferably an inorganic salt having a divalent cation, and most preferably lime, is added to the waste liquid to impart to the system a charged-density such that substantially all of the suspended particles flocculate or agglomerate into masses or particles which can be removed readily from the liquid. These flocculated impurities can be removed from the liquid waste in this phase of the treatment process. It is preferable to add a polyelectrolyte, along with the aforementioned "divalent" inorganic salt, to the liquid waste containing the floc produced in the densifying phase.

It is believed that the denser flocculated particles produced in the first phase of the process act as nuclei for floc formation of the particles which are generally more resistant to floc formation. In accordance with this invention, such "floc-resistant" particles are agglomerated readily in the succeeding phase of the process to a form in which they are separated readily from the treated liquid.

As will be described in greater detail below, the liquid waste can be treated with biomasses and/or chemical oxidizing agents to remove impurities which may be present, but which are not removed by the above described chemical-physical treatment.

The multi-phase chemical-physical treatment process of this invention provides a method for purifying liquid waste effectively at relatively high flow rates without the necessity for primary settling of the waste prior to the chemical-physical treatment. The invention significantly reduces the amount of land and associated module equipment needed to purify liquid wastes.

Another advantage of the multi-phase treatment system of the invention is that by employing the partially flocculated particles produced in the first phase or stage of the process as nuclei for flocculating the more difficultly removed particles in the succeeding phase of the process, suspended particles, including highly charged, colloidal particles, are removed from the liquid waste far more rapidly than would be the case if all flocculating agents were allowed to act on the liquid waste simultaneously. Thus, the process of the present invention can treat liquid waste at a greater flow rate than a process wherein all of the flocculating agents are added to the liquid waste simultaneously.

DETAILED DESCRIPTION OF THE INVENTION

Figure 1:
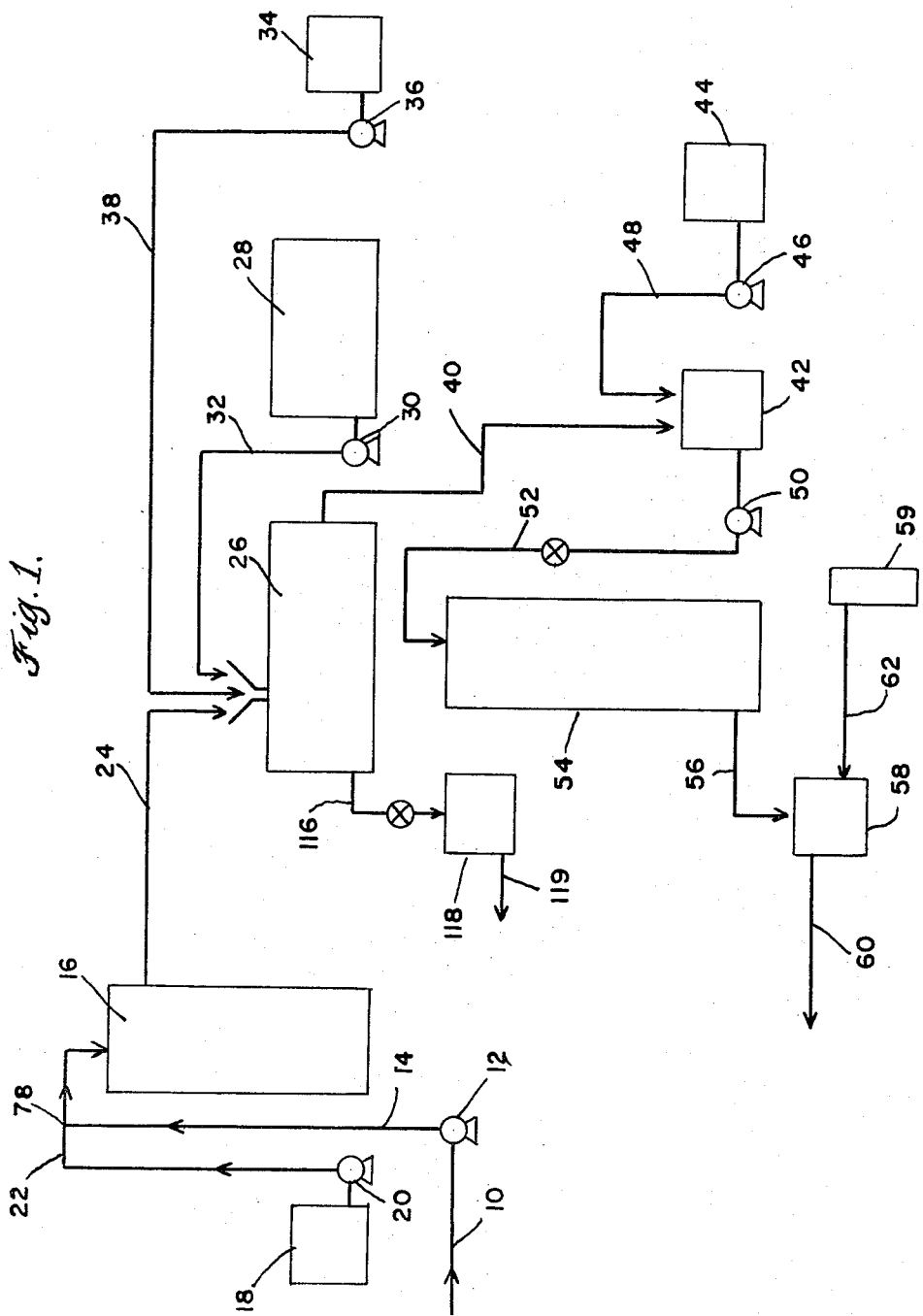
FIG. 1 is a flow diagram of a liquid waste treatment process in accordance with the present invention.

With reference to FIG. 1, a liquid waste, which may include both suspended particles and dissolved solids, such as, for example, industrial waste, raw sewage or the like, enters the system via line 10 after passage through a coarse wire mesh screen (not shown) to remove coarse particles. A pump 12 transfers the liquid from line 10 through line 14 to a densifying zone defined by a densifier 16. A first charge-density reducing agent such as, for example, an aqueous solution of ferric chloride, is transferred from a tank 18 by pump 20 through line 22 into the densifier 16 for mixing with the waste liquid in the densifier 16 in the manner described in detail hereinbelow with reference to FIG. 2.

The treated waste liquid which is discharged from the densifier 16 passes through line 24 for introduction into another chemical-physical treatment stage, the particle removal zone defined by a particle removal chamber 26. The treated waste liquid which enters the chamber 26 contains suspended therein floc formed in the densifier 16 by the action of the charge-reducing agent added thereto.

A second charge-density reducing agent such as, for example, an aqueous solution of lime, is added to the particle removal chamber 26 from tank 28, by the action of pump 30, through line 32.

Also, and as shown in FIG. 1, a polyelectrolyte is added preferably to the treated waste liquid in the chamber 26. The polyelectrolyte is contained in the tank 34 and is transferred to the chamber 26 through line 38 by the pump 36. The particle removal chamber 26 is described in detail below with reference to FIG. 3.

Inasmuch as the treated waste liquid discharged from the particle removal chamber 26 is basic as a result of the addition thereto of lime, it should be neutralized. To accomplish this, the liquid is transferred through line 40 to a neutralization tank 42. An acidic solution is added to the liquid from acid-containing tank 44 by the action of pump 46 which pumps it through line 48 into the tank 42. The neutralized liquid can be discharged from the neutralization tank 42 into the surrounding environment.

On the other hand, the neutralized liquid can be subject to further treatment if desired. For example, and as shown in FIG. 1, the neutralized liquid is transferred by pump 50 through line 52 to a biological treatment module 54, wherein the liquid is passed over selective biomasses for the oxidation of free ammonia to stable nitrates. This treatment has certain advantages. If the treated waste liquid containing free ammonia were discharged to a body of water such as a stream, the ammonia would consume oxygen in the body of water as it was oxidized to nitrates. This is undesirable. Thus, by converting the ammonia to nitrates in the waste treatment system, the oxygen demand on bodies of water into which the treated liquid is discharged is reduced.

It is noted also that phosphates in the presence of nitrates are food nutrients for algae. As will be discussed more fully below, the waste treatment system of the present invention is effective in removing phosphates from the waste liquid. The removal of the phosphates prior to the time the treated liquid having therein nitrates is discharged into a receiving body of water deprives algae therein of nutrients. This aids in maintaining a minimal algae profile in the receiving body of water.

The biologically treated liquid can be subjected to further treatment. For example, and as shown in FIG. 1, the treated liquid from the biological treatment module 54 is passed through line 56 to holding tank 58 into which chlorine can be fed from the tank 59 through the line 62. Inasmuch as the free ammonia has been removed from the treated liquid in a preceding stage of the system, only a relatively small amount of chlorine need be added to the liquid in the tank 58 to reach the "break-point chlorination" level. (This is the addition of sufficient chlorine to the treated liquid waste so that 85% of the chlorine therein is free, that is in the form of HOCl.) The smaller the quantity of chlorine that has to be added to reach this level, the more economical the treatment process. In accordance with the treatment described above, the liquid waste can be purified economically to a level such that the purified water can be reused.

After treatment with chlorine in the tank 58, the treated liquid can be discharged from the waste treatment system through the line 60.

Figure 2:
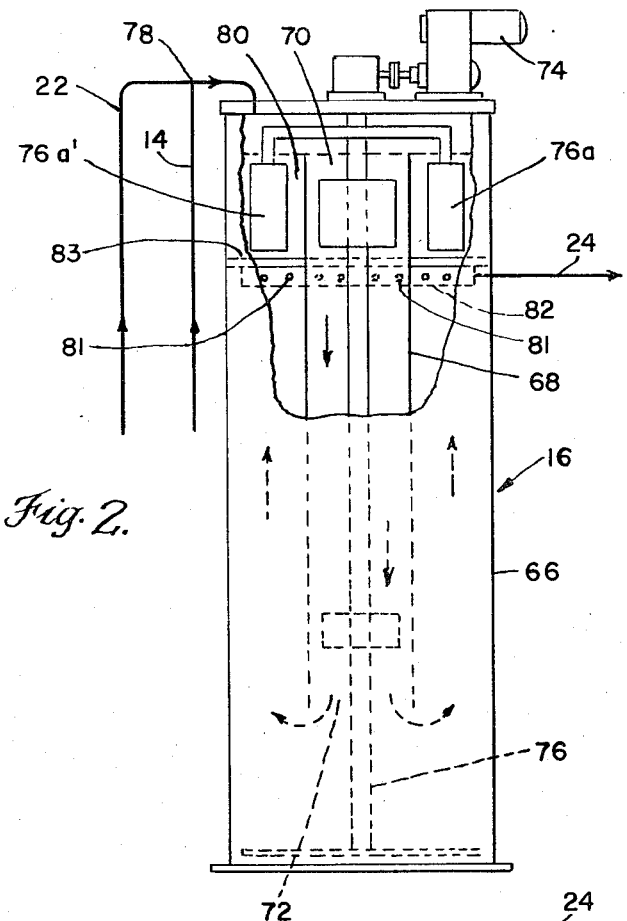
FIG. 2 is a view in side elevation, partially broken away, of the densifying zone shown in FIG. 1.

With respect to the structure of the densifier 16, as shown in detail in FIG. 2, it comprises a generally upright cylindrical outer shell 66 within which is disposed an inner tube 68 having a top opening 70 and a bottom opening 72. The top and bottom openings 70 and 72 of the inner tube 68 are spaced from the top and bottom of the outer shell. A motor 74 is mounted on the top of the outer shell 66 and drives a rotatable agitator or mechanical mixing means 76 disposed within the densifier 16.

The liquid waste line 14 and the charge-reducing agent line 22 merge at junction 78 so that the waste and charge-reducing agent are introduced together into the primary mixing zone 80 located in the upper interior of the shell 66 between the shell and the upper portion of the tube 68 and separated from the lower portion of the densifier 16 by the solid annular plate 83. The liquid waste and the charge-reducing agent are mixed intimately in the primary mixing zone 80 by the rotating paddles 76a and 76a'.

The treated liquid waste flows out of the mixing zone 80 into the tube 68 through the top opening 70 and then downwardly through the tube 68 and out of its bottom opening 72. The waste then flows upwardly through the annular space between the tube 68 and the shell 66 until it reaches an annular, apertured, hollow ring 82 of smaller outside diameter than the shell 66. The waste flows into the hollow ring 82 through the apertures 81 and passes out of the densifier 16 through line 24 that communicates with the ring 82.

The function of the charge-density reducing agent added to the liquid waste in the densifier 16 is to reduce the charge-density that is, tend to neutralize most of the charge-density, of particles contained therein. This causes the particles to coagulate and partially flocculate, thereby producing a dense mass of micro floc. Because it is critical to the practice of the present invention that the dense mass of micro floc remain suspended in the waste liquid when the liquid is treated subsequently with another charge-density reducing agent, the charge-density of the particles initially should not be reduced or neutralized to such an extent that they will settle from the liquid. Thus, they should be neutralized to an extent that they can be maintained in suspension or dispersion in the liquid by agitation, stirring or otherwise. In general, to achieve this, the charge-density of the particles, as measured by a Zeta meter, should be no greater than about 0 mv., for example about $-2$ mv. to about $-6$ mv., depending on the characteristics of the waste.

The initial treatment of the liquid waste with a charge-density reducing agent produces floc or agglomerated particles from the more readily floccuable particles within a relatively short period of time, for example about 10 to about 20 minutes. The resultant floc appears to function as nuclei or seed particles about which additional particles which are more resistant to floc formation collect when the liquid waste having the floc therein is treated subsequently with another charge-reducing agent. The "final" floc formed is of sufficient density or size that it is capable of being separated readily from the waste liquids. Thus, the present invention is capable of removing conveniently impurities that other chemical-physical processes often do not remove and this can be accomplished in a relatively short period of time and without the need of long settling times.

The amount of charge-density reducing agent added to the liquid waste initially will depend on numerous factors, including the specific charge-density reducing agent utilized, the type of liquid waste being treated, the extent to which and the time in which it is desired to effect the reduction in charge-density and the types of impurities in the liquid waste. With respect to the last mentioned factor, such impurities, which can be removed according to this invention, can include hydrophobic and hydrophilic particulates in micro-macro forms and certain organic materials which react or otherwise combine with the charge-density reducing agent added. In this connection, it should be noted that the amount of charge-density reducing agent added should be an amount sufficient to combine or react with such materials, and in addition, an amount sufficient to reduce the charge-density of the particles to the extent desired.

In view of the many different factors which can influence the amount of charge-density reducing agent used, it is recommended that for any given system, said amount be determined on the basis of experience. It is noted that for some applications, but not for all, as will be described below, the isoelectric point of the treated waste liquid can be used as a guide in adding the desired amount of charge-density reducing agent. The isoelectric point is the pH at which the charge-density of the system is equal to 0 mv.; this holds true for some waste liquids, but for others it does not. For example, in treating a waste liquid with a charge-density reducing agent comprising ferric chloride, theoretically the zeta potential of the system should be 0 mv. when the treated liquid has a pH of about 5.6. For a treatment system which follows the theoretic norm, measurement of the pH of the liquid can be used as a guide in determining the amount of ferric chloride to add because the pH will tend to approach 5.6 as the zeta potential approaches 0. Systems may not follow the theoretical norm because of the demand characteristics of impurities on the charge-density reducing agent used. Whether or not the system has a zeta potential of 0 mv. at the isoelectric point must be determined on the basis of experience and experimentation with the waste liquid to be treated. In those cases where it does not, the zeta potential will not be 0 mv. at a particular pH and the zeta potential must be measured to determine whether the charge-density of the system is in the desired range; if not, additional charge-density reducing agent should be added.

In the practice of the present invention, it is preferred that the charge-density reducing agent added initially function in an acidic medium, that is the liquid waste should be acidic. The reason for this is as follows. As mentioned hereinabove, the presence in the waste of hydrophilic particulates creates difficulty in the neutralization thereof because of a protective water-bound layer which surrounds the colloid. This protective water-bound layer makes neutralization more difficult when the waste liquid is basic than when it is acidic. Thus, initial coagulation and partial flocculation of the particles is accomplished more effectively in an acidic medium than in a basic medium. In general, the lower the pH, the more effective the charge-density reducing agent will function in reducing the charge-density of the particles thereby effecting coagulation and partial flocculation more readily.

It is noted that the zeta potential of polluted waters is usually at least about $-15$ mv. Sufficient charge-density reducing agent can be added to reduce the zeta potential to a preferred range of about $-2$ to about $-6$ mv. The suspended particles that coagulate are those which are relatively easily reduced in charge-density and flocculated. Although the amount of first charge-density reducing agent added to obtain this zeta potential depends somewhat on the initial charge-density of the liquid to be treated, and other factors as mentioned above, excellent results have been achieved in treating polluted river water having an initial zeta potential of about $-12$ mv. to about $-18$ mv. with the addition of ferric chloride in an amount of about 80 to about 100 p.p.m. based on the weight of the polluted river water.

It is preferable that the initial charge-density reducing agent that is added to the liquid waste be an inorganic salt having a trivalent cation. In comparing such salts with those having a cation of lower valence, the former has the advantage that they, being more highly charged, neutralize the negatively-charged particles more quickly and more effectively. As mentioned above, the neutralization can occur very quickly, for example within about 10 to about 20 minutes. This has the advantage that the liquid in the densifier 16 need not be held up for any substantial period of time. Desirably, this contrasts with heretofore known waste treatment processes where the liquid in the primary settling stage may be detained for a few hours or more while solids settle at a relatively slow rate. It should be understood that the liquid in the densifier 16 can be maintained therein for longer periods of time than for 20 minutes, but in general this will not be necessary.

Of the various types of charge-density reducing agents that can be used, ferric chloride is the most preferable. In addition to its being relatively inexpensive, the use of ferric chloride provides a number of functional advantages. In this connection, it is noted that treated or purified waste liquid is neutralized usually to a pH of about 7 before it is discharged to the environment. A valuable property of ferric chloride is that it and compounds formed from its ions are insoluble over a wide pH range, for example about 5.6 to about 12. This has the advantage that impurity insolubles which are separable from the liquid phase of the waste form over a wide pH range, including a pH of about 7, the usual "discharge" pH.

On the other hand, other charge-density reducing agents, including other inorganic salts having a trivalent cation are insoluble over a much more limited pH range. For example, aluminum sulfate is effective in reducing the charge-density of particle impurities contained in the waste, but upon increasing the pH thereof to make it basic, for example, in excess of about 10, to precipitate other impurities, the aluminum sulfate redissolves and may not tend to come out of solution when the treated waste is neutralized subsequently to a pH of about 7. Thus, although there can be used other charge-density reducing agents such as, for example, aluminum chloride, alum, and ferric sulfate, it is most preferred to use ferric chloride in the first treatment stage.

The denser agglomerated particles or mass of micro floc produced in the densifier 16 should be maintained in suspension or dispersed in the liquid phase of the waste. Vigorous agitation can be used to accomplish this. Substantially all, that is, at least about 95%, of the aforementioned particles or mass of micro floc should be maintained in suspension or dispersed in the liquid phase of the waste for treatment with the second charge-density reducing agent. As shown in the drawings, it is preferred that the treatment of the liquid waste be carried out on a continuous basis. Thus, substantially all of the aforementioned agglomerated particles or mass of micro floc formed in the first phase of the treatment process and dispersed or suspended in the liquid phase of the waste should be transferred continuously to the succeeding state of the process where it is treated with the second charge-density reducing agent, as will be described in detail below. Thus, there is little or no settling of particulates in the first process stage, that is, in the densifier 16.

Figure 3:
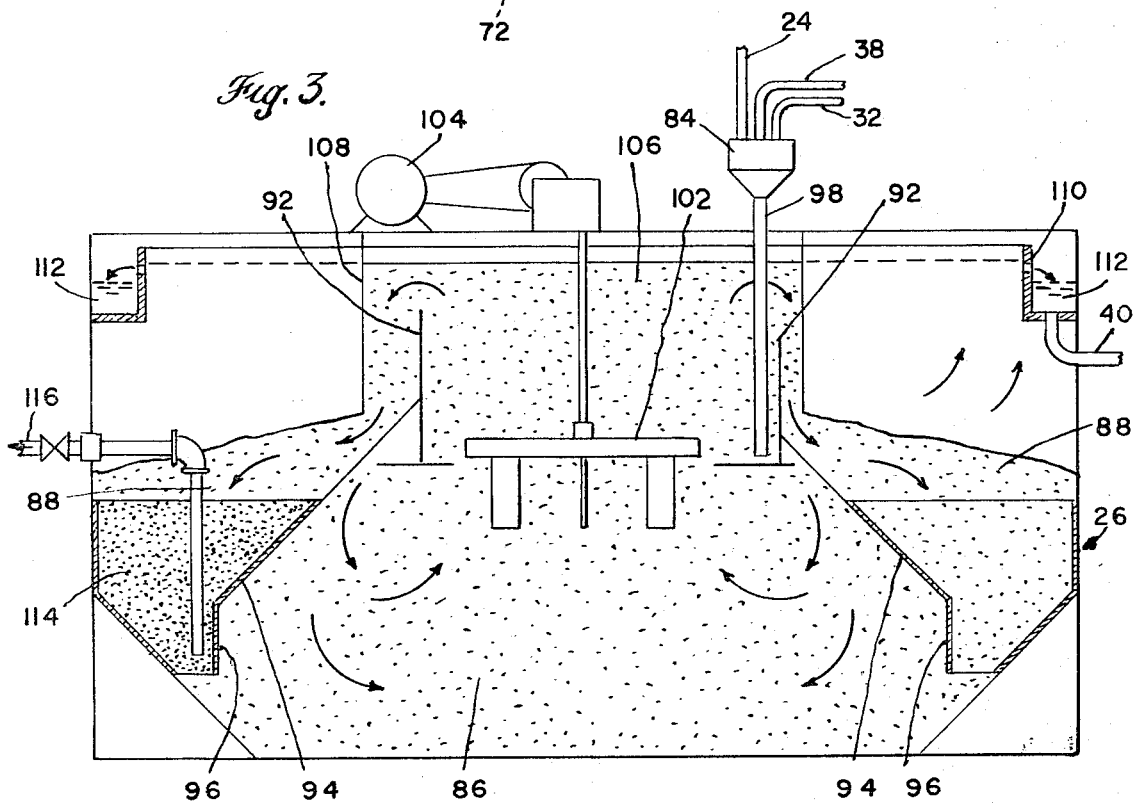
FIG. 3 is a view in side elevation of the particle removal zone shown in FIG. 1.

The treated liquid waste, including the resulting suspended particles, are transferred from the densifier 16 through line 24 for introduction into the particle removal chamber 26 for a succeeding chemical-physical treatment. As shown in FIG. 3, the particle removal chamber 26 has an inlet funnel 84 for receiving the treated liquid waste from the densifier 16, a second charge-density reducing agent from line 32, and a polyelectrolyte from line 38. The particle removal chamber, in plan view, is circular in shape and in side elevation as seen in FIG. 3, is generally divided into centrally disposed primary and secondary mixing and reaction zones 86 and 106 respectively and a peripherally located clarification or sedimentation zone 88. The mixing and reaction zones 86 and 106 are segregated from the clarification zone 88 by wall means, including an upper hollow cylindrical wall section 92, a depending outwardly tapered, truncated conically shaped wall section 94, and a lower cylindrical wall section 96 of increased diameter.

The treated liquid waste, charge-density reducing agent and polyelectrolyte flow from the funnel 84 via the inlet pipe 98 into the primary mixing and reaction zone 86 wherein the mixture is mixed continuously and intimately by the action of rotor-impeller 102, driven by the motor 104. The resulting slurry of flocculated particles flows upwardly from the primary mixing and reaction zone 86 to the secondary mixing and reaction zone 106, from which the slurry overflows the upper walls 92 into the clarification or sedimentation zone 88.

The agglomerated floc precipitates or separates from the liquid medium in the clarification zone 88 and gravitates toward the bottom of the clarification zone 88 while the clear liquid rises to the top thereof and overflows through an apertured wall 110 into a collection trough 112. The clear liquid flows out of the trough through line 40 for neutralization as described hereinabove. The settled or precipitated solids gravitate to the bottom of the clarification zone 88 and are collected in concentrator 114 from whence this sludge is removed periodically through line 116 into a sludge tank 118 (see FIG. 1). The sludge can be removed from tank 118 through line 119.

The particle removal chamber 26 is in effect an upflow clarifier in which there is formed, as the waste is treated, a gelatinous mass blanket comprised of particle impurities. As liquid waste flows up through the blanket, particle impurities are entrapped thereby, for example by adsorption, absorption or collision. Thus, the blanket grows heavier with time as all of the waste liquid flows therethrough. As described above, the clear liquid, which exits the top of the blanket, is collected in the trough 112.

The charge-density reducing agent added to the liquid waste having suspended or dispersed therein floc formed in the previous treatment stage can function to further reduce the charge-density of particle impurities in the waste and place them in a form in which they are readily separable from the liquid phase of the waste. Preferably, a polyelectrolyte which promotes bridging between particles is used also to accomplish this.

It is noted that the charge-density of the waste may have been reduced to 0 mv. by the action of the first charge-density reducing agent. Addition of the second charge-density reducing agent may impart a positive charge-density to the system, for example, up to about $+5$ mv. However, it is preferred that the charge-density of the system be about 0 mv. in order to realize most effective final flocculation. The use of an anionic poly-electrolyte will tend to neutralize such a positive charge-density, for example, drive it from about $+5$ mv. toward about $+1$ mv. to about $-1$ mv.

For some wastes, it is advantageous and, thus preferred in the practice of this invention, to raise the pH of the liquid waste to a basic value in order to precipitate therefrom other impurities such as, for example, heavy metal ions, phosphates and cyanides. To precipitate such types of impurities, the pH should be raised to at least about 11. This can be effected by adding a material which functions to both reduce the charge-denstiy of the particles and raise the pH of the waste. Preferably, an inorganic salt having a divalent cation is used to accomplish this. Most preferably, lime is used. However, other "divalent inorganic salts" such as magnesium carbonate can be used.

The amount of charge-density reducing agent added will depend on various factors including the specific agent utilized, the charge-density of the particles in the waste, the amount thereof, and the type of impurities present. An amount sufficient to react with any impurities that are reactable therewith and to reduce the charge-density to the extent desired should be used. It is recommended that this amount be determined by experience with any given system in view of the aforementioned factors which can vary from one system to the next.

It is recommended that a sufficient amount of charge-density reducing agent be added so that the charge-density of the particles is at least about $+2$ mv. In general, it has been found that when the charge-density of the particles are between $+2$ mv. and less than about $-2$ mv., there are formed agglomerated masses which are readily separable from the liquid phase of the waste. To aid in effecting this agglomeration, polyelectrolytes, which are high molecular weight organic materials of either natural or synthetic origin, can be used.

The polyelectrolytes enhance the formation of good floc at slightly greater, that is, more negative Zeta Potential than would otherwise be the case. Thus, the use of the polyelectrolyte, together with the charge-density reducing agent, is preferred because it accelerates the formation of the floc. Also, lesser amounts of the charge-density reducing agent can be employed.

A preferred polyelectrolyte is an anionic polyelectrolyte such as, for example, a polyacrylamide. A polyacrylamide marketed under the trade designation "A–23" by Dow Chemical Company has been used to excellent advantage. However, other polyelectrolytes, which are well known in the art, can be used.

The amount of polyelectrolyte used can best be determined on the basis of experience with any given system. For guidance purposes, it is recommended that the polyelectrolyte be used initially in a concentration of about 0.1 to about 1 part per million based on the weight of the waste being treated. Adjustments can be made to the concentration of the polyelectrolyte if needed.

By way of specific example, it is noted that very extensive removal of impurities has been effected from polluted waters that have been treated previously as described hereinabove to a Zeta Potential of about $-2$ to about $-6$, by further treatment to reduce the charge-density of the particles to about $+2$ mv. and to raise the pH of the waste to at least about 11. This further treatment was accomplished by adding about 0.1 to about 1 part per million of a polyacrylamide electrolyte (A–23) and about 100 to about 400 parts per million of lime, each based on the weight of the waste being treated. Test runs have shown that for this type of treatment there can be obtained: a removal of biological oxygen demand (BOD) of about 83 to about 93%; a removal of chemical oxygen demand (COD) of about 78 to about 88%; a removal of suspended solids of about 85 to about 95%; and a removal of phosphates of about 96 to about 99%. The turbidity of the resulting effluent was about 0.2 to about 1.5 parts per million.

The detention time of the liquid in the particle remover chamber 26 will tend to vary depending on a number of different factors including the amount and type of impurities and the amount of charge-density-reducing agent used and will best be determined by experience. However, for exemplary purposes, it is noted that excellent removal of flocculated impuritities from the liquid has been effected with liquid detention times of about 20 to about 40 minutes. Thus, it should be appreciated that the total detention time, including the detention time of the liquid in the densifier 16 (about 10 to about 20 minutes) and the detention time in the particle remover chamber 26 (about 20 to 40 minutes) is relatively short compared with heretofore known systems which include primary settling of an hour or more followed by relatively long secondary settling.

The chemical-physical waste treatment method described hereinabove can be used effectively to remove particle impurities, including colloidal or finely divided suspended matter, from the waste liquid; it can be used also to remove dissolved solids which react with the charge-density reducing agents to form particulate matter which is capable of being coagulated and flocculated. An important aspect of the invention is that it can be used also in combination with other waste treatment methods for removing other types of impurities, for example, dissolved solids which are not removable by the chemical-physical method. For example, selective biological and/or chemical oxidation methods can be used in combination with the chemical-physical method of this invention to remove such impurities or to convert them to an innocuous form or to place them in a form such that they are removed by the chemical-physical method.

By way of example, it is noted that biological oxidation can be utilized to remove ammonia from the waste liquid as described hereinabove in connection with the description of FIG. 1. In this type of treatment, the impurity is converted to an innocuous form that is, to nitrates. On the other hand, other dissolved materials, including organic materials which are not removed by the chemical-physical method, can be oxidized biologically to place them in a form which is removable by the chemical-physical treatment method. For example, they can be placed in a micro-cellular form which is subject to being coagulated and converted into readily settleable floc by the charge-density reducing agents; or they can be oxidized biologically to a soluble material which is reactable with the charge-density reducing agent to form particulates which are capable of being coagulated and flocculated. Such selective biological oxidation, which can be carried out according to known methods, will depend, of course, on the types of impurities which are present in the liquid. The biological oxidation can precede or succeed the charge-density reducing treatments, depending on the impurities present.

In addition to, or alternatively, depending on the impurities in the waste liquid, chemical oxidation can be used also to remove impurities or place them in an innocuous form or one which is capable of being removed by the chemical-physical treatment method described herein. For example, when ferric chlorideis used as the initial charge-density reducing agent, the treated waste liquid will generally be acidic. To this acidic medium, there can be added oxidizing agents which have their greatest oxidizing potential in an acidic medium for the purpose of oxidizing dissolved organic or other impurities which may not be removed by the chemical-physical treatment method. Examples of such impurities include aliphatic and aromatic compounds such as phenols, aldehydes, ketones, benzene compounds, etc. The chemical oxidizing agent such as, for example $ClO_2$ and chlorates will oxidize such compounds theoretically to carbon dioxide and water. Other related compound impurities can be oxidized selectively by other oxidizing agents such as, for example, free hypochlorous acid (HOCl). In the event that the impurities are not oxidized completely to carbon dioxide and water, partially oxidized materials may be converted to intermediates which are reactable with or amenable to adsorption by a charge-density reducing agent such as ferric chloride. Thus, they are converted to particulates which are capable of being coagulated and flocculated by the charge-density reducing agents. Such oxidizing agents can be added to the waste liquid prior to, along with or after the addition of the charge-density reducing agent.

On the other hand, chemical oxidizing agents which have their greatest oxidizing potential in a basic medium can be added to the waste liquid when the pH thereof is above 7 for the purpose of selectively oxidizing organics or other dissolved impurities such as amines, acrylates, mercaptans, etc. which may not be removed by the chemical-physical treatment method. Examples of such oxidizing agents include potassium permanganate, ozone and peroxides.

It should be noted that the above are but examples of the various treatment methods that can be included in the practice of the present invention. And it should be understood that the selection of the particular oxidizing agent, biological and/or chemical, and the stage at which the waste liquid is treated therewith will depend on the impurities that are present in the waste liquid.

It should be understood also that the particular charge-density reducing agent added initially to the waste liquid will depend on the types of impurities present therein. For example, in treating waste liquids that have a high content of heavy metal ions, it can be advantageous to treat the liquid first with a charge-density reducing agent, such as lime, which will alkalize the liquid and thereby form solids with the aforementioned metals. Thereafter, another charge-density reducing agent such as ferric chloride can be added to the treated liquid having particulates suspended therein. In addition, the extent to which the charge-density of the system is reduced by the addition thereto of an initial charge-density reducing agent will depend on the nature of the impurities contained in the waste liquid. The extent of reduction can be to the point where the system has a zeta potential of 0 mv., as long as the coagulation of the particulates and flocculation thereof does not proceed to an extent that the resulting particulates cannot be maintained in a suspended or dispersed state for subsequent treatment with another charge-density reducing agent.

EXAMPLES

The examples set forth below illustrate the treatment of aqueous wastes in accordance with the present invention. The polyelectrolyte used in the examples was a polyacrylamide sold by Dow Chemical Co. under the tradename "A–23".

Example 1

An aqueous industrial waste having a Zeta Potential of −34 mv. and the other characteristics set forth in Table 1 below and containing nitric acid, sulphuric acid, nitrobenzene, benzene, aniline and other organic compounds was treated as follows. There were added to a sample of the waste, which was contained in a 1000 ml. beaker, 500 p.p.m. of $FeCl_3$ in the form of an aqueous solution. The pH of the waste remained at 1.6, its original value. Thereafter, 8 p.p.m. of $ClO_2$ was added; the pH rose to 2.3. The waste being treated was agitated continuously at about 60–70 r.p.m. for about 10 minutes. The thus treated waste, which contained coagulated impurities, had a zeta potential of about −6 mv. Thereafter, 1500 p.p.m. of lime and 1 p.p.m. of polyacrylamide were added. The waste was stirred at about 15 r.p.m. for about 15 minutes. The pH rose to 5.5. Further agglomeration was effected producing an extremely dense gelatinous mass. The purified liquid separated therefrom was analyzed. The results of the analysis are set forth in Table 1 below.

TABLE 1

| Characteristic | Raw waste | Treated liquid | Percent reduction |
|---|---|---|---|
| BOD (5 day), p.p.m | 4,500 | 162.5 | 96.6 |
| COD, p.p.m | 5,050 | 1,295 | 74.3 |
| Suspended solids, p.p.m | 296 | 216 | 26.5 |
| Dissolved solids, p.p.m | 27,224 | 6,584 | 75.8 |
| Total solids, p.p.m | 27,520 | 6,800 | 75.3 |
| pH | 1.6 | 5.5 | |
| Specific conductance, micromohs | 28,000 | | |
| Turbidity, Jackson units | 1.5 | 1.4 | |
| Color, intensity | 2,100 | 10 | 99.5 |

From the results set forth in Table 1 above, it can be seen that excellent removal of impurities from the liquid waste was effected.

The next example below shows the treatment of an aqueous industrial waste which include heavy metals among its impurities. This industrial waste had been subjected previously to biological oxidation for 15 days to reduce the initial BOD and COD. However, as will be seen from the analysis of the waste set forth in Table 2 below, subsequent treatment according to the present invention effected further reduction in BOD and COD and removal of suspended solids over and above that effected by the conventional biological oxidation treatment. The waste was treated initially with lime and then with $FeCl_3$ and a polyelectrolyte.

Example 2

Raw liquid waste, the analysis of which is set forth in Table 2 below, and having a zeta potential of −15 mv. was treated by adding thereto 750 p.p.m. of lime. The treated waste was stirred for about 10 minutes at about 60–70 r.p.m. The pH rose from 8.3 to 11.1 and the zeta potential dropped to −3 mv. Thereafter, 250 p.p.m. of $FeCl_3$ and 1 p.p.m. of polyacrylamide polyelectrolyte were added. The liquid waste was stirred for about 15 minutes at about 15 r.p.m. The zeta potential of the resulting treated liquid was −1 mv. and the pH was 10.5. After separating the particle impurities, the purified liquid showed the analysis set forth in Table 2 below.

TABLE 2

| Characteristics | Raw waste | Treated liquid | Percent reduction |
|---|---|---|---|
| BOD (5 day), p.p.m | 200 | 20 | 90.0 |
| COD, p.p.m | 1,130 | 565 | 49.8 |
| Total organic carbon, p.p.m | 830 | 155 | 81.3 |
| Turbidity, Jackson units | 37 | 0.26 | |
| Color, intensity | 2,620 | 560 | |
| Suspended solids, p.p.m | 380 | 0 | 100.00 |
| Total solids, p.p.m | 22,060 | 11,920 | 46.0 |
| Dissolved solids, p.p.m | 21,680 | 11,920 | 45.0 |
| pH | 8.3 | 10.5 | |
| Specific conductance, micromohs | 28,000 | | |
| Total alkalinity, p.p.m | >250 | | |
| $PO_4$, p.p.m | 5 | 1.0 | 80.0 |
| Ni, p.p.m | 6.0 | 2.0 | 66.7 |
| Cu, p.p.m | <0.2 | <0.1 | |
| Cr, p.p.m | 1.3 | 0.8 | 38.5 |

The next example shows the treatment of the raw liquid waste of Example 2 above and the use also of an oxidizing agent which was effective in increasing significantly the reduction of COD and total organic carbon above that effected in Example 2.

Example 3

The raw liquid waste of Example 3 was treated in the same manner as that of Example 2, and in addition, 50 p.p.m. of $KMnO_4$ were added after the lime and before the $FeCl_3$ were added. The analysis of purified liquid is set forth in Table 3 below.

TABLE 3

| Characteristics | Treated liquid | Percent reduction |
|---|---|---|
| BOD (5 day), p.p.m | 24.0 | 88.0 |
| COD, p.p.m | 362 | 67.9 |
| Total organic crabon, p.p.m | 90 | 89.2 |
| Turbidity, Jackson units | 0.29 | |
| Color, intensity | 340 | |
| Suspended solids, p.p.m | ----- | 100 |
| Total solids, p.p.m | 11,100 | 49.7 |
| Dissolved solids, p.p.m | 11,100 | 48.8 |
| pH | 10.5 | |
| $PO_4$, p.p.m | 1.0 | 80.0 |
| Ni, p.p.m | 1.0 | 83.3 |
| Cu, p.p.m | <0.1 | |
| Cr, p.p.m | 0.3 | 76.9 |

The next two examples show the treatment of an aqueous industrial waste having the following characteristics,

LIQUID WASTE A

| | | |
|---|---|---|
| BOD (5 day) | p.p.m | 135 |
| COD | p.p.m | 203 |
| Total Solids | p.p.m | 600 |
| Suspended Solids | p.p.m | 87.5 |
| Turbidity, Jackson Units | | 28 |
| pH | | 6.6 |
| Zeta Potential | mv | −21 |
| Specific Conductance | micromohs | 690 |
| $NH_3$ | p.p.m | 19 |
| $PO_4$ | p.p.m | 6.8 |
| Total Alkalinity | p.p.m | 60 |

Example 4

Ten p.p.m. of $FeCl_3$ were added to waste liquid A above. The treated waste liquid was stirred for about 10 minutes at about 60–70 r.p.m. The pH dropped from 6.6 to 6.3 and the zeta potential from −21 mv. to −15 mv. Particulate matter in the waste liquid coagulated and to this liquid containing the suspended particulates, 260 p.p.m. of lime and 0.1 p.p.m. of polyacrylamide polyelectrolyte were added. Stirring was carried out for 15 minutes at about 15 r.p.m. The pH of the liquid rose to 11.1 and the zeta potential dropped to 0 mv. Analysis of the purified liquid showed that the percent reduction of BOD was 91.1% and the percent reduction of COD was 82.5%. Turbidity was reduced 99%, $PO_4$ 75.7% and $NH_3$ 52.6%.

Example 5

Waste liquid A above was treated in exactly the same way as that set forth in Example 4 above, and in addition, 5 p.p.m. of $KMnO_4$ was added after the pH was increased to 11.1. The purified liquid upon analysis showed the following percent reduction: BOD—90.6%; COD—84.5%; turbidity—98%; $PO_4$—78.3%; and $NH_3$—52.6%.

A comparison of Examples 4 and 5 shows that the use of the oxidizing agent, $KMnO_4$, in Example 5 was effected in increasing the percent reduction of COD and $PO_4$.

The next two examples show the treatment of an aqueous industrial waste comprising residual washings from a pulp mill and analyzing as follows.

WASTE LIQUID B

| | |
|---|---|
| BOD, (5 day) p.p.m. | 3200 |
| COD p.p.m. | 6960 |
| Suspended Solids, p.p.m. | 1520 |
| Total Solids p.p.m. | 6880 |
| Dissolved Solids p.p.m. | 5360 |
| Turbidity, Jackson Units | 110 |
| Color | 370 |
| pH | 7.3 |
| Specific Conductance micromohs | 2700 |
| Zeta Potential mv. | —17 |
| Total Alkalinity p.p.m. | >250 |

Example 6

Waste liquid B above was treated with 400 p.p.m. of $FeCl_3$. The treated waste was stirred for about 10 minutes at about 60–70 r.p.m. The pH dropped from 7.3 to 4.6 and the zeta potential from —17 mv. to —2 mv. Coagulation of particulates was effected. To the waste having the coagulated particles therein, 1000 p.p.m. of lime and 0.1 p.p.m. of polyacrylamide polyelectrolyte were added. Stirring was carried out for about 15 minutes at about 15 r.p.m. The pH rose to 11.1. Analysis of the purified liquid is set forth in Table 4 below which follows Example 7.

Example 7

Waste liquid B above was treated in exactly the same way as set forth in Example 6, and in addition, 4 p.p.m. of $ClO_2$ were added after the addition of $FeCl_3$ and prior to the addition of the lime. The analysis of the purified liquid is set forth in Table 4 below.

TABLE 4

| | Ex. 6 | Ex. 7 |
|---|---|---|
| BOD (5 day), p.p.m. | 310 | 380 |
| COD, p.p.m. | 1,600 | 1,400 |
| Suspended solids, p.p.m. | 0 | 0 |
| Total solids, p.p.m. | 2,476 | 4,464 |
| Turbidity, p.p.m. | 0.4 | 0.8 |
| Color | 920 | 720 |

With respect to the analyses set forth in Table 4 above, calculations show that the BOD and COD were reduced 90.3% and 77% respectively for the waste treated in accordance with Example 6 and 88.1% and 79.8% respectively for that treated in accordance with Example 7.

In summary, it can be said that the present invention affords the means for treating effectively various types of waste materials, including sewage and industrial waste. Advantages afforded by the present invention include the effective treatment of wastes in a relatively short period of time and in a manner such that relatively low capital investment is needed for the building of a waste treatment plant suitable for practicing the present invention.

What is claimed is:

1. A process for purifying a liquid aqueous waste containing suspended particles and dissolved solids and impurities having a biochemical oxygen demand and chemical oxygen demand comprising the sequential steps of adding a first charge-density reducing agent, ferric chloride, to the liquid waste in an amount sufficient to reduce the charge-density of particles contained therein to about —6 mv. to about 0 mv.;

adding a second charge-density reducing agent, lime, to the liquid waste in an amount sufficient to impart thereto a charge-density of about —2 mv. to about +5 mv. and thereby effect flocculation of particles therein; and separating the flocculated particles from the liquid waste thereby removing impurities from the liquid waste;

wherein prior to the addition of said lime to said waste, sufficient time is allowed to pass for particles in said waste to coagulate into denser particles through the action of said ferric chloride, and wherein substantially all of the particles in the waste are suspended in said waste when said lime is added thereto, and wherein said waste containing said ferric chloride and prior to the addition thereto of said lime is acidic.

2. The process of Claim 1 including also adding a polyelectrolyte to the liquid waste having suspended therein said denser particles.

3. The process of Claim 1 including also effecting biological and/or chemical oxidation of impurities in said waste.

4. The process of Claim 1 wherein the zeta potential of said waste prior to the addition thereto of said ferric chloride is at least about —15 mv. and wherein said waste containing said ferric chloride and said denser particles suspended therein is transferred and wherein said lime is added to said transferred waste.

5. The process of Claim 4 wherein there is also added to said transferred waste a polyelectrolyte thereby aiding flocculation of said particles.

6. The process of Claim 4 including acidifying said waste if necessary so that said ferric chloride functions in an acidic medium wherein said lime is added in an amount sufficient to make the liquid waste alkaline and wherein an anionic polyelectrolyte is also added to said transferred waste.

7. The process of Claim 6 wherein the amount of ferric chloride is about 80 to about 100 p.p.m., the amount of lime is about 100 to about 400 p.p.m. and the amount of polyelectrolyte is about 0.1 to about 1 p.p.m.

8. The process of Claim 4 wherein the zeta potential of the transferred waste is about —2 to about —6 mv. and wherein the zeta potential of the transferred waste having therein said lime is about +2 to about —2 mv.

9. The process according to Claim 7 wherein the zeta potential of the transferred liquid waste is about —2 to about —6 mv. and wherein the zeta potential of the transferred liquid waste having therein said lime is about +2 to about —2 mv.

10. The process according to Claim 4 wherein the liquid having impurities removed therefrom is subjected to biomasses which convert ammonia in said liquid to nitrates.

11. The process according to Claim 4 including also effecting chemical and/or biological oxidation of impurities in said waste.

12. The process according to Claim 4 including acidifying said waste if necessary so that said ferric chloride functions in an acidic medium and including also chemically oxidizing impurities in said acidic waste prior to transfer.

13. The process according to Claim 4 wherein said lime is added in an amount to make said waste alkaline and including also chemically oxidizing impurities in said alkaline waste.

14. The process according to Claim 1 including also chlorinating the liquid having said impurities removed therefrom.

15. The process according to Claim 4 including also chlorinating the liquid having said impurities removed therefrom.

16. The process according to Claim 10 including also chlorinating said liquid containing said nitrates.

17. The process of Claim 1 wherein said waste is raw sewage.

18. The process of Claim 4 wherein said waste is raw sewage.

19. The process of Claim 6 wherein said waste is raw sewage.

20. The process of Claim 9 wherein said waste is raw sewage.

References Cited

UNITED STATES PATENTS

| | | | |
|---|---|---|---|
| 3,423,309 | 1/1969 | Albertson | 210—18 X |
| 3,594,313 | 7/1971 | Carlson | 210—18 |
| 3,488,717 | 1/1970 | Wukasch et al. | 210—53 |
| 3,168,465 | 2/1965 | Kraus et al. | 210—16 X |
| 3,709,364 | 1/1973 | Savage | 210—11 X |
| 966,196 | 8/1910 | Goodman | 210—51 X |
| 3,183,186 | 5/1965 | Oster | 210—52 |
| 3,235,491 | 2/1966 | Rosenberg et al. | 210—53 X |
| 3,617,568 | 11/1971 | Ries | 210—53 |

OTHER REFERENCES

Parsons, William A., "Chemical Treatment of Sewage & Industrial Wastes," National Lime Association, Washington, D.C., 1965, pp. 38–39.

Riddick, T. M. "Zeta Potential and its Application to Difficult Waters," Jour. AWWA, Vol. 53, August 1961, pp. 1007–1030.

THOMAS G. WYSE, Primary Examiner

U.S. Cl. X.R.

210—53